Oct. 9, 1962 R. P. GRIFFITH 3,057,250
DEVICE TO ALIGN AND LOCATE BLOCKS AND
CYLINDERS USING OPTICAL INSTRUMENTS
Filed June 30, 1960 3 Sheets-Sheet 2
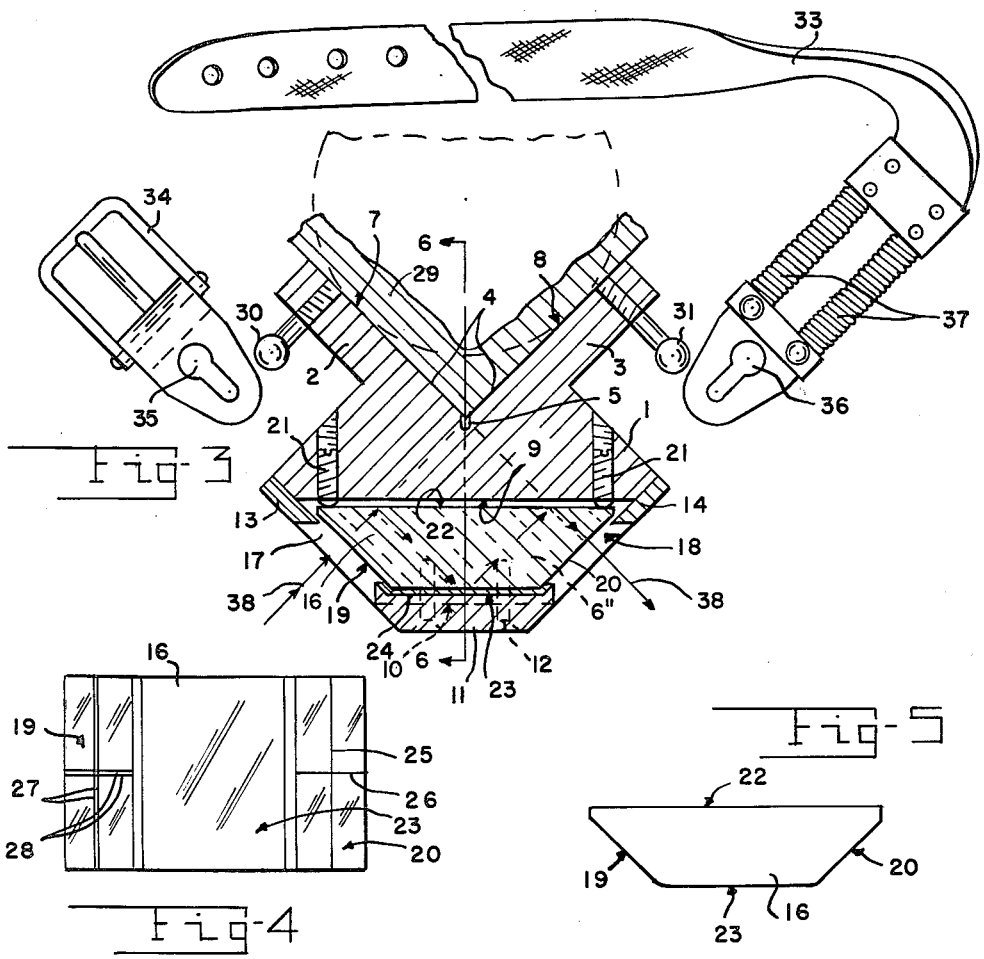
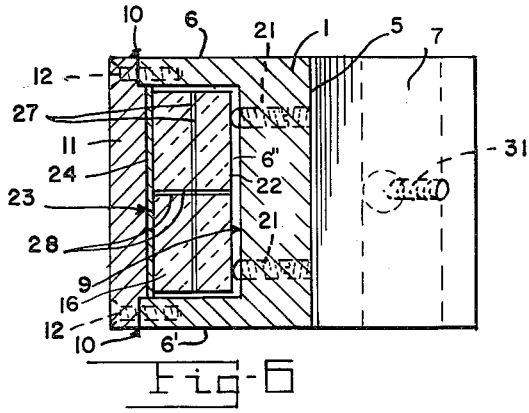
INVENTOR.
ROBERT P. GRIFFITH
BY
ATTORNEYS Oct. 9, 1962

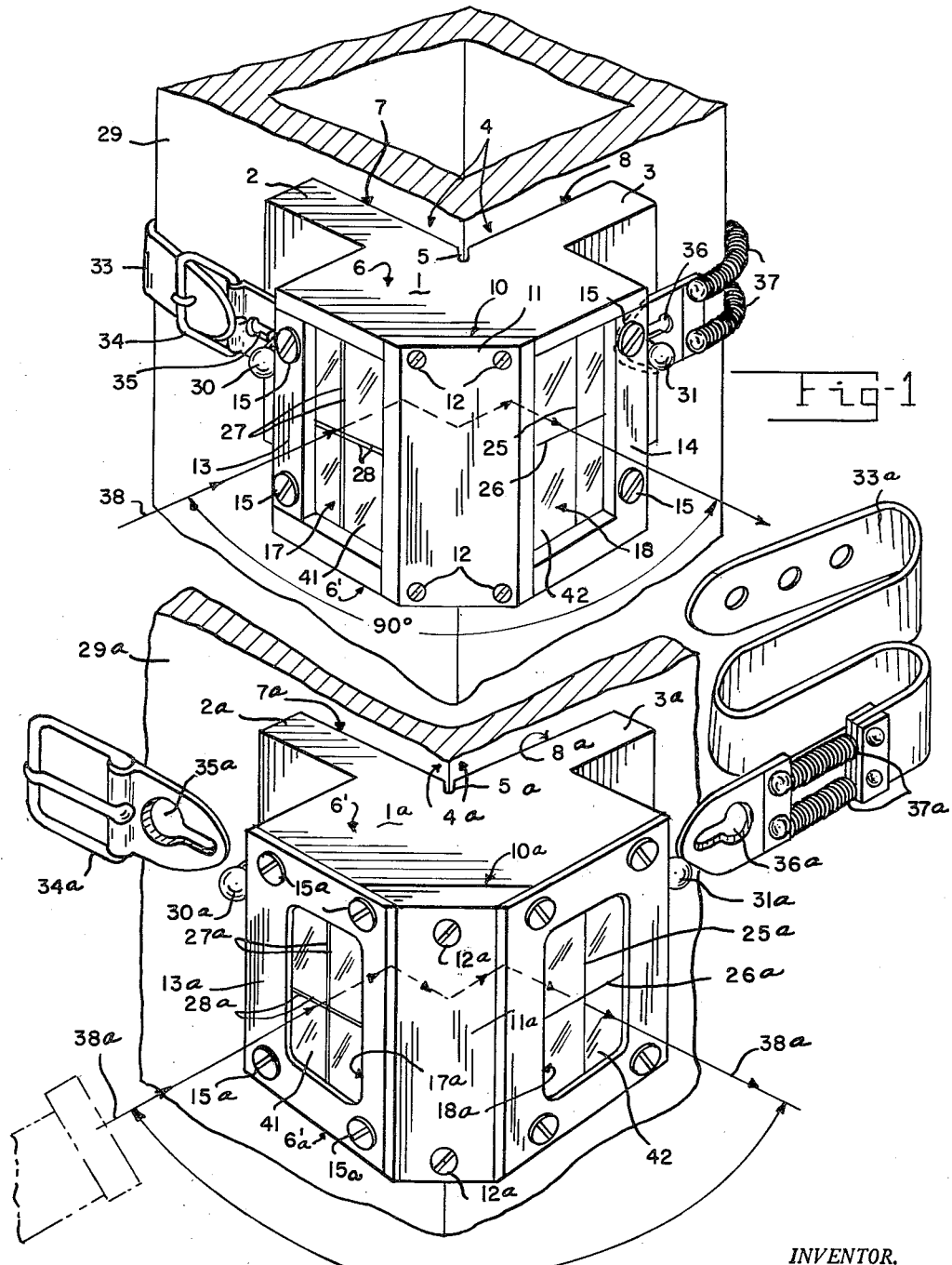

R. P. GRIFFITH 3,057,250

DEVICE TO ALIGN AND LOCATE BLOCKS AND
CYLINDERS USING OPTICAL INSTRUMENTS

Filed June 30, 1960

INVENTOR.
ROBERT P. GRIFFITH

BY

ATTORNEYS

United States Patent Office 3,057,250
Patented Oct. 9, 1962

3,057,250
DEVICE TO ALIGN AND LOCATE BLOCKS AND CYLINDERS USING OPTICAL INSTRUMENTS
Robert P. Griffith, 2205 June Lane,
Oklahoma City 15, Okla.
Filed June 30, 1960, Ser. No. 40,116
8 Claims. (Cl. 88—2.2)
(Granted under Title 35, U.S. Code (1952), sec. 266)

The invention described herein may be manufactured and used by or for the United States Government for governmental purposes without payment to me of any royalty thereon.

This invention is a device for use in conjunction with optical alignment equipment such as telescopes or transits for locating and aligning the edge of a square or rectangular block or post and setting the faces of the block coincident to the location of a predetermined optical plane, the device being also employed to locate two sides of a cylindrical block or support in predetermined optical planes.

Ordinarily, when locating blocks or cylindrical rods by the use of optical tooling it is customarily necessary to have a target on which to focus the telescope of the instrument and the edge or side of the rectangular or square block does not present a suitable target as it cannot be brought into accurate focus, also the problem of aligning the axis of a cylinder or cylindrical rod by the use of optical instrument presents a more impossible problem. The present device presents a target which is displaced from the surface or edge actually being aligned, and yet presents an image as if it were the edge or corner of that surface, and has the advantage of permitting a more accurate alignment due to the construction of the device.

A further object is the provision of a simple optical device which may be clamped or otherwise secured to a rectangular or cylindrical block, for use with a transit or telescope or the like at a distance for aligning one corner and one face of the rectangular block in the plane of the axis of the telescope, and in the case of the cylindrical block or rod accurately aligning one side of the cylindrical block in the plane of the axis of the telescope.

A further object is the provision of a device for use with a transit which provides a support having a 90° opening for engaging the adjacent sides of a rectangular block, or 90° displaced tangent points on the wall of a cylindrical block and provides 90° light reflecting or refracting means including sighting target lines disposed in alignment with each of the walls of the V opening for indicating the disposition of the planes of both of the walls of the V opening when the axis of the line sight from the transit is disposed in the plane of the surfaces of either of the walls of the 90° V opening.

A further object is the provision of a block of metal machined with a 90° V with a recess milled above the apex of the V and a dove prism or mirror positioned in the recess having hair lines or target lines inscribed on the outer faces arranged such that the extension of a plane along the surface of one side of the V would pass through the hair lines engraved in the middle of one face of the dove prism and the extension of the plane along the surface of the other side of the V opening will pass between closely spaced parallel double lines engraved on the opposite face of the dove prism, the hair lines being engraved midway across the width of the faces of the prism parallel to the first set of hair lines, the surfaces of the dove prism so inscribed being, of course, disposed in 90° angular relation to each other.

A further object is the provision of adjusting means for adjusting the dove prism in relation to the planes of the surfaces of the V opening, in which the index of refraction of the prism material has a minimum of 1.5, or the prism is mirrored on its face and roof.

A further object is the substitution of a pair of parallel spaced front surfaced mirrors and transparent sighting planes having hair lines engraved thereon disposed in the planes of the surfaces of the V opening, in which the mirrors are spaced apart a predetermined distance to dispose the reflections of the hair lines in the planes of the opposite sides of the V openings.

Other objects and advantages of the invention will become apparent from the following description and accompanying drawings in which like reference characters refer to like parts in the several figures.

FIG. 1 is a perspective view of one form of my invention illustrating the same applied to a vertical rectangular column;

FIG. 2 is a modified form of the invention showing the holding strap means detached and in perspective;

FIG. 3 is a horizontal sectional view with the retaining strap and buckle means detached and in perspective;

FIG. 4 is a view in elevation of the roof or dove prism employed in the preferred form shown in FIG. 1;

FIG. 5 is a bottom plan view of the dove prism shown in FIG. 4;

FIG. 6 is a vertical sectional view taken about on the plane indicated by line 6—6 in FIG. 3;

Figure 7:
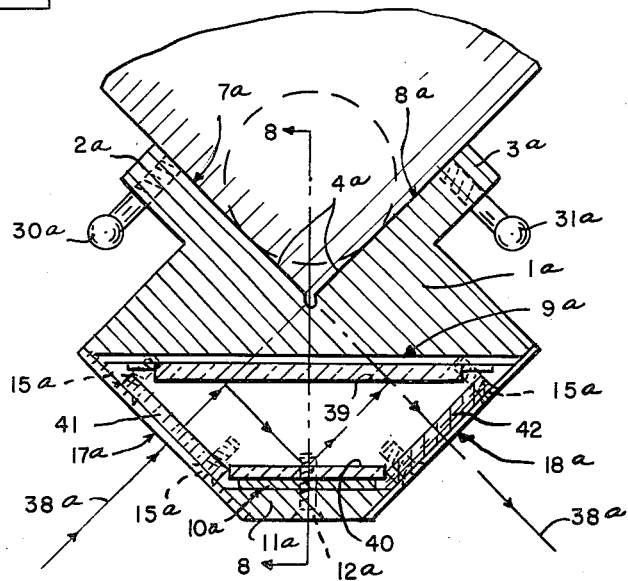
FIG. 7 is a transverse sectional view similar to FIG. 3 taken on a horizontal plane through the modification shown in FIG. 2, employing front surface mirrors instead of the dove prism.

Referring to the drawings, particularly to FIGS. 1, 3, 4, 5 and 6, the reference numeral 1 denotes a machined block or body having side flanges or angular extensions 2 and 3 in which a precision 90° V opening is machined, indicated at 4, with a small channel 5 at the apex of the V.

The front of the block 1 is machined flat intermediate its top and bottom surfaces 6 and 6' to provide a dove prism receiving channel 6" having a flat surface 9 disposed in a 45° angular relation to the two surfaces 7 and 8 of the V opening 4.

The block 1 is substantially rectangular in shape as shown in FIGS. 1, 3 and 6 with its corner front surface truncated at 10 to receive a keeper plate 11 which is secured in place, as seen in FIG. 1, by screws 12. Side retainer plates 13 and 14 are also secured to the block 1 by screws 15. This provides retainer means for a dove or roof prism 16 and sight openings 17 and 18 are provided for the beveled end faces 19 and 20 of the prism 16.

The roof or dove prism 16 is adjustably disposed in the channel 6", being retained in place by the retainer or keeper plates 13, 14, and 11, and is adjustable toward and away from the flat surface 9 in parallel relation to the flat surface 9 by four supporting set screws 21 threaded through the block 1, providing a four corner support, so to speak, for the rear or larger face 22. The other or shorter parallel front face 23 is engaged in position by the keeper plate 11, and after being adjusted to the desired position a suitable supporting medium, such as sealing wax, indicated at 24 is provided to prevent accidental shifting displacement of the prism 16.

The prism is preferably formed of refractive material such as glass having a minimum index of refraction of 1.5, or the prism may be mirrored on the face and roof surfaces 22 and 23 and of such a precision thickness between the surfaces that the angle of refraction of a line of sight entering one end of the prism perpendicular thereto, having its axis coincident with the plane of one of the surfaces 7 or 8 is refracted or reflected out through the other beveled end, perpendicular thereto on an axis extending in the plane of the other of the surfaces 7 and 8.

One end 20 of the prism 16 is inscribed with vertical and horizontal single cross hair lines 25 and 26, the cross hair lines 25 being disposed in a plane coincident with the plane of the surface 7 of the V opening 4, while the other beveled end 19 of the roof prism 16 is inscribed with closely spaced double vertical and horizontal cross hair lines 27 and 28, in which the vertical cross hair lines 27 are disposed in parallel relation immediately next to a plane coincident with the other surface 8 of the V opening, passing midway between the vertical lines 27.

The horizontal cross hair line 26 is disposed to lie in a parallel relation to the double horizontal cross hair lines 28 midway therebetween, and normal to both the V surfaces 7 and 8.

Referring to FIGS. 1 and 3, the V opening has 90° angularly disposed plane surfaces 7 and 8 for the purpose of receiving a corner of any rectangular body or post 29 therebetween, or it can receive a cylindrical post or body. In the later event the cylindrical body would lie with its sides disposed on the sides of the V opening in 90° angular tangential contacting relation.

In order to secure the device on the post or block 29 the right and left angular extensions 2 and 3 are each provided with a spherical headed stem or post 30, 31 for detachably receiving an encircling strap device 33 having a buckle 34 at one end provided with a bayonet slot 35 for engaging the post 30. A bayonet slotted plate 36 is provided for securing the other end of the strap on the post 31. Spring means 37 are provided in the strap 33, as shown, to maintain holding tension on the device when fitted on a rectangular body such as 29 with the strap 33 secured in position on the posts 30 and 31 as seen in FIGS. 1 and 3, or when clamped onto a cylindrical post or rod.

From the above it will be observed that the single hair line 25 will be disposed in the plane of the surface 7 while the double hair lines 27 are disposed immediately on opposite sides of the plane of the surface 8 and the dove prism 16 reflects or refracts the hair lines 25 and 27 into the same plane, with the cross hairs 25 and 27 superimposed on each other along the sighting axis 38. Thus when the device is secured on a rectangular post 29 or a cylindrical block or rod the two coordinates for locating the position of the rectangular rod or cylinder which are at 90° angular relation to each other can be established along the sighting axis 38, with respect to the sides of the post or cylinder.

Figure 8:
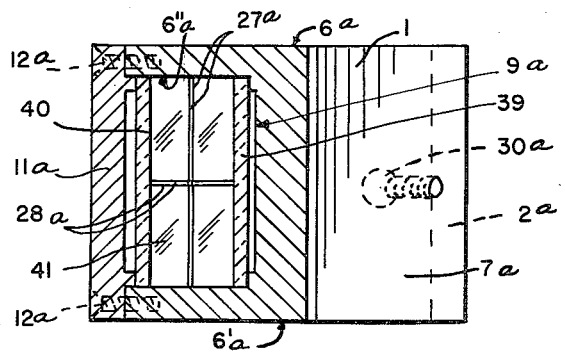
FIG. 8 is a vertical sectional view taken about on line 8—8 of FIG. 7.

Reference being made to the modified form of the device shown in FIGS. 2, 7 and 8 the construction is substantially the same except that a pair of front surface mirrors are employed and a pair of optical plate glass sighting planes are employed instead of the optical dove or roof prism 16. These comprise a long mirror 39, a short mirror 40 and hair lines inscribed sighting glasses 41 and 42. Since the balance of the construction of the modification is substantially the same, the similar parts will be identified by the same reference numeral but with an added exponent such as a.

With reference to FIGS. 7 and 8, the long and short front surface mirrors 39 and 40 are positioned facing each other in predetermined spaced relation to each other, secured by any suitable retaining means and disposed parallel to each other at a 45° angular relation to the surfaces 7ª and 8ª of the V opening 4ª. The spacing between the mirrors is such that a line of sight along the sighting axis 38ª which is located in the plane of one of the surfaces 7ª or 8ª of the V opening will be reflected as shown in FIG. 7 by the two mirrors 39 and 40 at 90° along a plane coincident with the plane of the other of the 90° angular surface 8ª or 9ª.

The two target sighting plates or windows 41 and 42 are disposed across the aforesaid planes normal thereto across the sighting openings 17ª and 18ª and the front or outer surface of the glass plate 42 is inscribed with the cross hair line 25ª in the plane of the surface 7ª and includes a transverse line 26ª normal to the line 25ª.

The other plate 41 has double parallel cross hair lines 27ª and 28ª similar to the lines 27 and 28, in which the double lines 27ª are closely spaced at opposite sides of a plane coincident to the plane of the surface 8ª and the lines 28ª are disposed immediately at opposite sides of a plane passing through the other cross hair line 26ª which is normal to both of the surfaces 7ª and 8ª of the V opening 4ª.

As seen, sighting along the axis 38ª and bringing the cross hairs 27ª and 25ª into alignment on the sighting axis 38ª through the sighting opening 17ª disposes the surface 8ª in the plane of the sighting axis while sighting along the axis 38ª through the window 18ª with the cross lines 25ª and 27ª in alignment disposes the surface 7ª on the sighting axis. When a rectangular block such as 29ª is clamped in the V opening 4ª the positions of the adjacent inclosed sides of the block can be located also the adjacent corner of the block 29ª can be located at the juncture of the sighting axes.

In the case of a cylindrical object sighting along one axis can determine with accuracy the position of one side of the cylindrical object with precision and the sight line on the reverse direction locates the position of the other side with precision.

I claim:

1. An optical alignment sighting device comprising a support having a V opening formed in one side thereof having 90° V surfaces for the reception of a rectangular or cylindrical member therein to be aligned, means at the other side of said support opposite said V opening disposed for reflecting a line of sight extending into one end of said other side of said support coincident with the plane of one of the 90° V surfaces in a direction through said other side of said support and out the other end thereof in a plane coincident with the plane of the other of the 90° V surfaces.

2. An optical sighting device comprising a support having a V opening formed in one side thereof having 90° angularly disposed surfaces for the reception therein and contact therewith of a rectangular or cylindrical member to be aligned, optical means at the other side of said support opposite said V opening having a sighting axis through said support entering one end of said support on an axis coincident with the plane of one of the surfaces of said V opening and leaving through the other end of said support on an axis coincident with the plane of the other surface of the V opening.

3. Apparatus as set forth in claim 2 including sighting for line means disposed at the opposite ends of said support in the planes of said sighting axis parallel to the planes of the surface of said 90° V opening.

4. An optical sighting alignment device comprising a body having a 90° V opening in one side thereof for the reception of a rectangular or cylindrical member therein, a dove prism fixed in said body opposite 90° V opening in 45° angular relation to the sides of the 90° V opening, said dove prism having 45° angularly disposed end faces, each disposed in 90° angular relation to one of the surfaces of the 90° V opening, disposed whereby a plane coextensive with the plane of each of the surfaces of the V opening extend substantially midway between the opposite ends of each of 45° angularly related end surfaces of the dove prism, and sighting hair lines inscribed on the end surfaces in the last mentioned planes disposed precisely in the planes of the 90° V-shaped openings and parallel to each other and both of the surfaces of the 90° V openings.

5. An optical sighting device comprising a rectangular block having angular extensions extending from two adjacent sides at 90° to each other, said block having a 90°

V-shaped opening formed therein between said angular extensions having 90° angularly disposed surfaces for the reception therein and contact therewith of a rectangular or cylindrical member to be aligned, optical sighting means fixed in said block opposite said extensions having a folded sighting axis through said support entering one end on an axis extending in a plane coincident to the plane of one of the 90° angularly disposed surface and leaving the other end of said block in a second plane, coincident to the plane of the other of said 90° angular surfaces.

6. An optical sighting device comprising a rectangular block having angular extensions from the adjacent sides thereof in 90° angular relation to each other, said block having a 90° V-shaped opening formed therein between said extensions having 90° angularly disposed surfaces for the reception therebetween and contact therewith of a rectangular or cylindrical member to be aligned, optical sighting means fixed in said block opposite said extensions in 45° angular relation to both of said angularly disposed surfaces having a folded optics sighting axis through said block entering one side in a plane coextensive to the plane of one of angularly disposed surfaces, normal to the plane of the other angularly disposed surface and leaving said block through the other side thereof in a plane coextensive to the plane of said other of the angularly disposed surfaces, normal to said one of said angularly disposed surfaces.

7. Apparatus as set forth in claim 6 including resilient strap means detachably connected to the outer ends of both of said extensions for encircling the rectangular or cylindrical member to be aligned when disposed in said 90° V opening between said surfaces for holding the apparatus on said member during the sighting operation with the sides of the body in contact with both of said angularly disposed surfaces.

8. An optical alignment sighting device comprising a support having a V opening in one side thereof, having 90° angularly disposed plane surfaces for the reception of a rectangular or cylindrical member therebetween to be aligned, optical reflecting means fixed in said support at the opposite side thereof comprising essentially a plural parallel front surface mirror means facing each other in parallel predetermined spaced relation at 45° angular relation to both of said angularly disposed surfaces, a sighting glass disposed across each end of the support in 90° angular relation to each other and 45° angular relation to the planes of the mirrors, said sighting glasses having sighting hair lines inscribed across the medium planes thereof parallel to each other in planes coincident to the planes of said angularly disposed surfaces, the reflecting surfaces of said mirrors being spaced from each other a predetermined distance for reflecting a line of sight entering one end of the support through said sightig glass in the plane of one of said hair lines and one of the angular surfaces, back and forth between the mirror surfaces and out of the support through the other sighting glass in a plane through the hair line of said other sighting glass in the plane of the other of the angularly disposed surface.

References Cited in the file of this patent
UNITED STATES PATENTS

| | | |
|---|---|---|
| 2,128,394 | Berek | Aug. 30, 1938 |
| 2,198,836 | Patton | Apr. 30, 1940 |
| 2,937,560 | Mades et al. | May 24, 1960 |

FOREIGN PATENTS

| | | |
|---|---|---|
| 13,562 | Great Britain | June 10, 1907 |